United States Patent
Smart

[15] 3,669,065
[45] June 13, 1972

[54] REACTOR SEAL
[72] Inventor: Raymond C. Smart, Hazardville, Conn.
[73] Assignee: United Aircraft Corporation, East Hartford, Conn.
[22] Filed: March 15, 1971
[21] Appl. No.: 124,390

[52] U.S. Cl..............................................118/48, 277/135
[51] Int. Cl.......................................................C23c 13/10
[58] Field of Search..................................118/48-50.1, 404, 118/405; 117/107.1, 119, 93; 277/135; 219/388, 275; 34/242

[56] References Cited

UNITED STATES PATENTS

| | | | |
|---|---|---|---|
| 1,144,595 | 6/1915 | Henderson | 118/48 X |
| 3,130,073 | 4/1964 | Van Der Linden et al. | 117/93 X |
| 3,479,205 | 11/1969 | Morelock | 117/93 X |
| 3,549,424 | 12/1970 | Rice | 118/49.1 X |
| 3,598,084 | 8/1971 | Whittier et al. | 118/49.5 |

Primary Examiner—Morris Kaplan
Attorney—John D. Del Ponti

[57] ABSTRACT

In apparatus wherein a moving wire is drawn through a reaction tube and a material is deposited thereon, a reactor seal is provided to isolate the reactant gases within the tube from the surrounding atmosphere. The reactor seal comprises a fitting having a generally vertically disposed passageway therethrough within which is disposed a pair of aligned orificed inserts through which the wire is drawn. A pool of liquid metal is supported on the lower insert at the orifice thereof by surface tension forces. Both inserts have downwardly converging inner walls leading to their orifice to facilitate threading.

3 Claims, 2 Drawing Figures

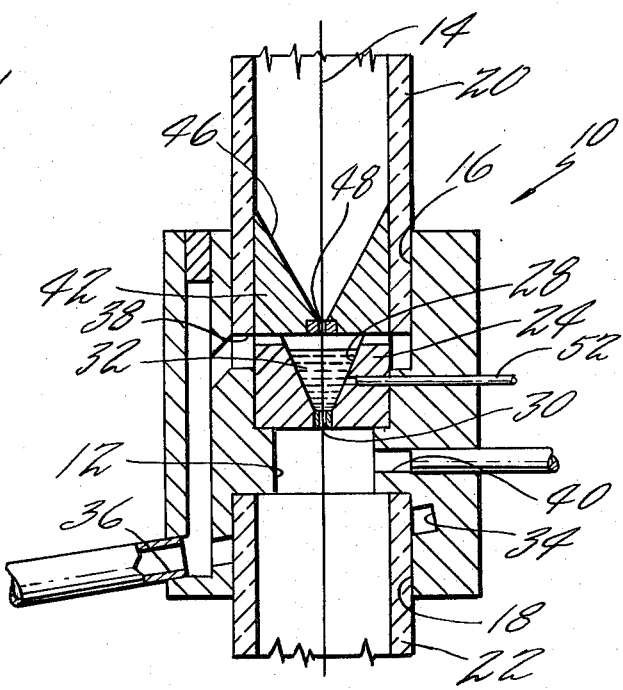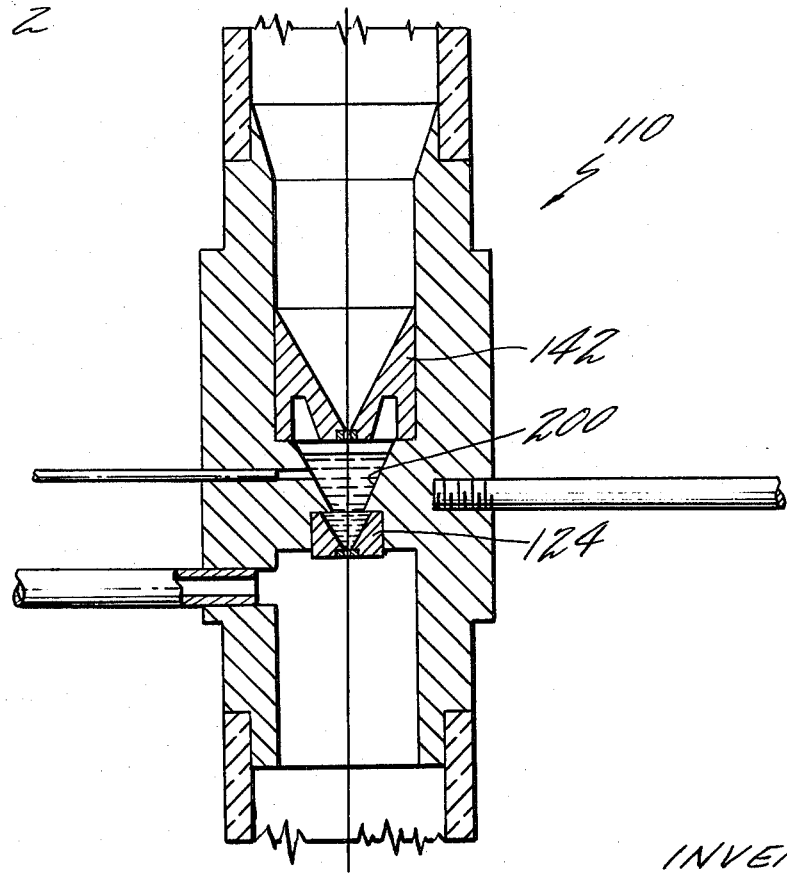

ered wire which is drawn
REACTOR SEAL

BACKGROUND OF THE INVENTION

This invention relates in general to sealing devices and, more particularly, to reactor seals incorporating a liquid sealant.

It is known that filamentary materials may be conveniently produced by pyrolytic techniques wherein the desired material is deposited on a resistively heated wire which is drawn through a reactant mixture containing the material in vapor form. One such technique is disclosed in U.S. Pat. No. 3,549,424 to Rice which shares a common assignee with the present invention. Improvements in the reactor seals or electrodes used in this type of method are shown in U.S. Pat. Nos. 3,453,986 and 3,453,987 to Rice et al. and St. Laurent, both also owned by the same assignee as the present invention. As commonly used in a vertical reactor, the electrode end portions are mated with the reactor end walls and contain a liquid sealant, typically mercury or an amalgam thereof, in order to make electrical contact between a high voltage power supply and the substrate being coated and to seal the reactor, that is, to prevent the escape of reactant gases from within the reactor. While the prior art devices represent advances in the art, particularly with respect to threading of the substrate, further improvements have been sought. In particular, difficulties in mercury transport, i.e. uniformly filling and completely emptying, with concomitant spillage of mercury was found to be an inherent, serious danger in their use. Further, considerable manipulations have been required to replace glass reactor tubes or thread or rethread reactors since electrodes has to be removed for these activities and realignment thereafter has been required. Still further, problems of pressure sensitivity and mercury vaporization have also existed.

SUMMARY OF THE INVENTION

In accordance with the present invention, a liquid metal-containing reactor seal end fitting having a vertical passageway through which a filamentary substrate is drawn is provided with a pair of aligned orificed inserts in the passageway. The lower insert supports the liquid metal at its orifice through surface tension forces. The upper insert is adapted to prevent vaporization of the liquid metal and act as a threading guide for the filament. According to one aspect of the invention, the cross section of each insert matches in area and shape the cross section of the fitting passageway in which it is received to prevent vaporization of the metal sealant. Further, each insert is provided with a central generally vertical passageway which is downwardly convergent to orifice size to facilitate threading.

BRIEF DESCRIPTION OF THE DRAWINGS

FIG. 1 is a view, taken in cross section, of a typical reactor seal incorporating the teachings of the present invention; and FIG. 2 is a view taken in cross section, of a modified reactor seal which also incorporates the teachings of the present invention.

DESCRIPTION OF THE PREFERRED EMBODIMENT

Referring now to the drawings, wherein like numerals indicate like parts, the numeral 10 designates a reactor seal comprising an end fitting which is usually formed of metal. The seal is provided with an axial passageway 12 through which a filament 14 passes to make ingress to or egress from a reactor. As will be appreciated by those skilled in the art, the seal 10 shown is particularly adapted for usage between stages in a two stage vertical reactor. In other words, the passageway 12 has enlarged diameter openings 16 and 18 at its upper and lower ends respectively for the sliding receipt of glass tubular members 20 and 22 which form the reactor vessel walls. The seal is thus adapted to closely fit with the tubular members 20 and 22. Of course, the same seal may be used at the lower end of the second stage reactor and at the upper end of the first stage reactor with little or no modification. As will be appreciated, the seal 10 is provided with a projecting arm which is preferably threaded for securement to an alignment fixture (not shown) in order to maintain proper positioning of the seal 10 with respect to the axis of the vertical reactor system.

Located just below the upper tube receiving opening 16 and forming a fine orifice in the passageway 12 is a ceramic or metal bushing or jewel holder 24. The bushing has a generally axial passageway, concentric with passageway 12, defined by a downwardly sloping, preferably conical surface 28 converging to an orifice 30, preferably formed by an insert of hard material such as aluminum oxide which is cemented or otherwise secured in place. The orifice is of a size large enough to allow free passage of the substrate therethrough yet small enough to retain a liquid sealant, such as mercury 32, thereon through surface tension forces. It has been found that the smallest dimension, i.e. the diameter in the case of a circular hole and the width in the case of a rectangular slot, is less than 0.015 inch and preferably 0.006 to 0.008 inch.

In a seal of the type shown, which is adapted to receive the upper end of a vessel tube, a groove 34, sloped downwardly and opening at its lowest end into a passageway 36 which leads to a mercury reservoir, not shown, is provided in the walls of opening 18 to prevent leakage of reactant gas. At the upper end of the seal, a groove 38 for filling the bushing and supporting the tube 20 is connected with the passageway 36. A gas inlet passageway 40 passes transversely through the wall of the seal 10 to provide transport of reactant gas to the lower reactor 22.

An upper jewel holder 42 which also acts as a threading guide is secured to the inner lower end of the upper tube 20 and is thus removable therewith from the seal 10. The guide 42 may preferably be a separate item as discussed below, but in any event, it, like the lower jewel holder 24, is characterized by having a generally vertical axial passageway, concentric with passageway 12, defined by a downwardly sloping, preferably conical surface 46 converging to an orifice 48. The orifice 48 is similar to orifice 30, and is preferably also formed by an insert of aluminum oxide. Typically, the orifice 48 is several times larger than the orifice 30 in order to facilitate threading and satisfactorily results have been obtained with an orifice size of 0.015 – 0.030 inch and preferably about 0.020 inch. As will be appreciated, an electrical lead arm 52 is provided to conduct the requisite electrical power from a source (not shown) to the liquid mercury in those vapor deposition processes which require resistance heating of the substrate.

In operation, starting with the fitting 10 filled with mercury, a threading or rethreading sequence is performed with facility and an extremely low degree of exposure to the toxic mercury. Of course, the mercury reservoir may be lowered so that the seal is gravity drained of all of its mercury contents but this is not a necessary or even desirable step. In a process where the filamentary substrate is difficult to handle or is very ductile, such as is the case when working with tungsten having a diameter of 0.005 inch, the use of a leader of relatively stiff or high modulus material, such as boron coated tungsten having a diameter of 0.040 inch, is advantageous. The leader is passed through each seal of the vertical reactor system, being guided by the steeply sloping surfaces 28 and 46 through the orifices 30 and 48. Next the tungsten filament is secured, adhesively or mechanically, to the leader and pulled through the reactor system and the vapor deposition process is commenced without the need for purging.

The seal described herein has not only virtually eliminated the need for handling of the liquid sealant, normally toxic mercury, but has resulted in an extremely efficient means for threading a reactor system. Further, the use of bushing inserts which are relatively easy to replace has obviated the prior need for replacement of entire electrode assemblies. Still further, the provision of an orificed insert above the liquid mercury acts to condense any mercury vapor and prevents typical blowouts which may occur from pressure perturbations.

In an alternate embodiment shown in FIG. 2, the seal 110 receives the glass tubes 20 and 22 on its outer end surfaces and has an upper jewel holder 142 as an item separate from the tube 20. The jewel holder 142 is slidably received within the axial passageway 112 and is seated, by gravity, on a ledge above a sealant chamber portion 200 which is formed in the seal 110 above the lower jewel holder 124. As shown, the mercury chamber 200 has relatively steep and downwardly converging side walls.

While the invention is described in connection with particular embodiments, no limitation is intended and modifications thereto will be evident to those skilled in the art within the true spirit and scope of the invention as set forth in the appended claims.

I Claim:

1. In a vertically arranged reactor vessel wherein a vapor deposition is effected on a moving filamentary substrate, a reactor seal comprising:
   a liquid sealant comprising a pool of mercury disposed at an end of the vessel and through which the substrate moves;
   an end fitting forming an end closure for the reactor vessel, the fitting having a generally vertically disposed passageway therethrough through which the substrate is drawn and the fitting supporting said liquid seal in said passageway; and
   a filamentary thread guide received in said passageway above said liquid seal and having a downwardly convergent passageway therethrough said guide comprising a baffle means to substantially prevent vaporization loss of said mercury pool.

2. In a vertically arranged reactor vessel wherein a vapor deposition is effected on a moving filamentary substrate, a reactor seal comprising:
   a liquid sealant comprising a pool of mercury disposed at an end of the vessel through which the substrate moves;
   an end fitting forming an end closure for the reactor vessel, the fitting having a generally vertically disposed passageway therethrough through which the substrate is drawn;
   a first insert disposed in said fitting passageway, said insert having a generally vertical passageway therethrough, said passageway terminating in an orifice small enough to retain said liquid sealant thereon through surface tension forces and large enough to allow free passage of said filamentary substrate therethrough;
   said liquid sealant being supported by said first insert;
   a second insert disposed in said fitting passageway above said first insert, said second insert having a generally vertical passageway therethrough concentric with said first insert passageway, said second insert passageway terminating in an orifice small enough to substantially prevent vaporization loss of said liquid sealant and large enough to allow free passage of said filamentary substrate therethrough.

3. The invention of claim 2 wherein the passageways in said first and second inserts are formed by downwardly converging inner walls.

* * * * *

PO-1050
(5/69)

UNITED STATES PATENT OFFICE
CERTIFICATE OF CORRECTION

Patent No. 3,669,065        Dated June 13, 1972

Inventor(s) RAYMOND C. SMART

It is certified that error appears in the above-identified patent and that said Letters Patent are hereby corrected as shown below:

Column 2, line 57      Delete "0.005" and insert --0.0005--.

Column 2, line 59      Delete "0.040" and insert --0.004--.

Signed and sealed this 28th day of November 1972.

(SEAL)
Attest:

EDWARD M. FLETCHER, JR.          ROBERT GOTTSCHALK
Attesting Officer               Commissioner of Patents